Figure 1:
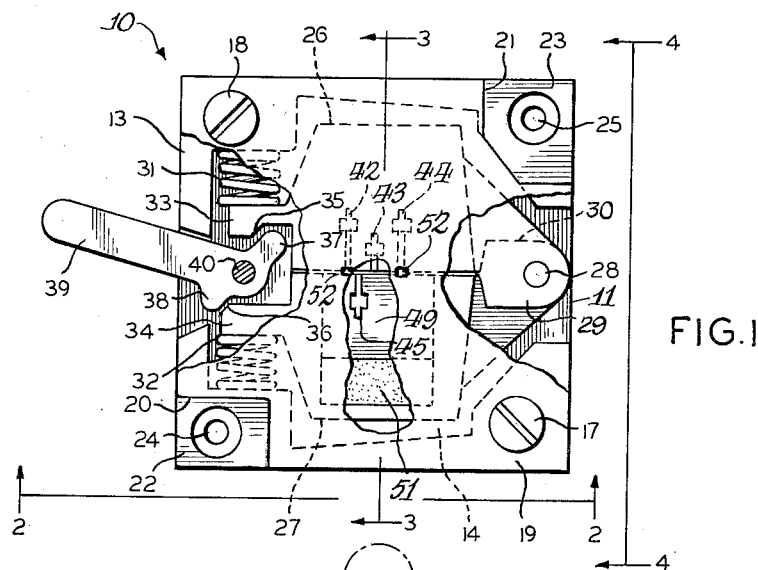

July 31, 1962 S. J. MAJEWSKI 3,047,687
ELECTRICAL SOCKET
Filed Sept. 23, 1960 2 Sheets-Sheet 1

INVENTOR.
STANLEY J. MAJEWSKI
BY John Todd
ATTORNEY

July 31, 1962  S. J. MAJEWSKI  3,047,687
ELECTRICAL SOCKET
Filed Sept. 23, 1960  2 Sheets-Sheet 2
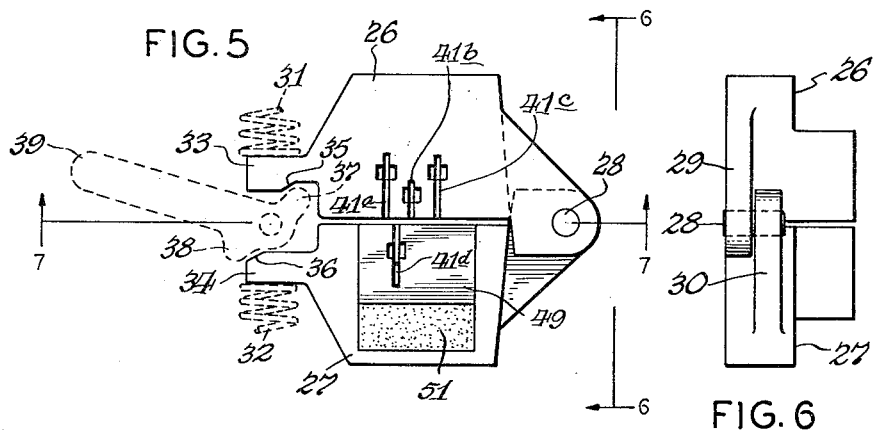
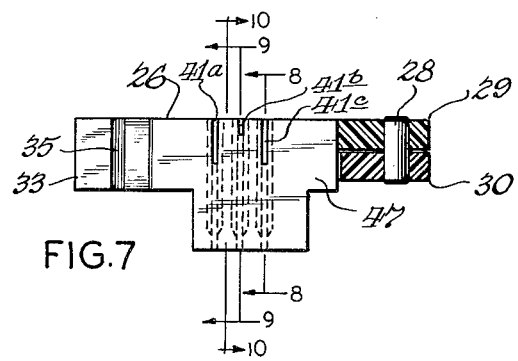
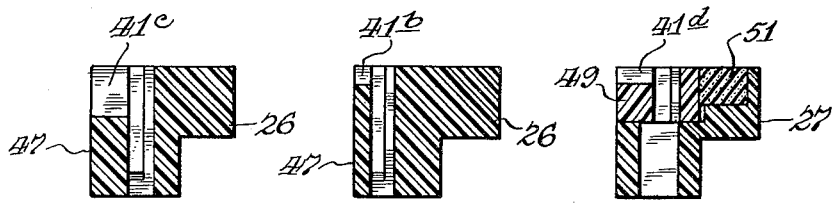
INVENTOR.
STANLEY J. MAJEWSKI
BY John Todd
ATTORNEY

United States Patent Office 3,047,687
Patented July 31, 1962

3,047,687
ELECTRICAL SOCKET
Stanley J. Majewski, Chicago, Ill., assignor to United-Carr Fastener Corporation, Boston, Mass., a corporation of Delaware
Filed Sept. 23, 1960, Ser. No. 57,975
3 Claims. (Cl. 200—51)

This invention relates to a socket for components having conducting leads, and more particularly to a socket especially useful in testing electric components or devices as, for example, transistors, tubes, etc.

Customarily, components of this kind are tested for electrical defects after their manufacture by inserting the prongs or leads of the component into contact-equipped receptacles respectively provided therefor in a test socket which comprises an element of a suitable test circuit. The usual test socket is substantially a duplicate of the commercial socket with which the component is used in an actual installation; and consequently, the contacts of such test sockets slidably and frictionally engage the prongs of each component tested therein, and it is the effectiveness of the frictional grip developed between the contacts and prongs that determines the quality of the electrical connection established therebetween. Since thousands of components must be tested in each socket, it will be apparent that the repeated insertions and removals of the prongs will result rather quickly in substantial contact wear, and therefore the quality of the electric connection established between the prongs and contacts will deteriorate to the point that replacement of the test socket is necessitated.

It is, accordingly, an object of this invention to provide a test socket in which contact wear is sharply minimized, whereby the useful life of the test socket is vastly increased. Another object of the invention is that of providing a test socket in which substantially no frictional wearing of the contacts occurs during insertion and removal of the prongs of a component from the test socket.

Still another object is in the provision of a test socket adapted for use in testing lead-equipped transistors and the like, and in which the contacts of the socket and/or structure cooperative therewith are selectively movable into locations remote from the path of insertion of the leads or prongs of such transistor during insertion thereof into the socket and removal therefrom, and are selectively movable into gripping engagement with such prongs or leads for test purposes. A further object is to provide a test socket of the character described in which the socket contacts either individually or collectively and/or structure cooperative therewith, in confining the prongs or leads of a test component in electrical connection therewith, is floatingly supported so as to effect a proper alignment of such prongs or leads with the contacts and thereby assure a good electrical connection therewith without damage to such prongs, and in which the contacts either individually or collectively and/or structure cooperative therewith is resiliently supported for establishing a good electrical connection between the contacts and prongs of a test component.

Yet a further object is that of providing a test socket of the type described that is structurally simple, reliable, in which the gripping force exerted by the contacts on the prongs or leads of a test component is readily varied, in which the contacts are readily replaced if such replacement shoulder ever be required, and in which accommodation of varied test components is a feature thereof. Additional objects and advantages of the invention will become apparent as the specification develops.

An embodiment of the invention is illustrated in the accompanying drawing, in which—

Figure 2:
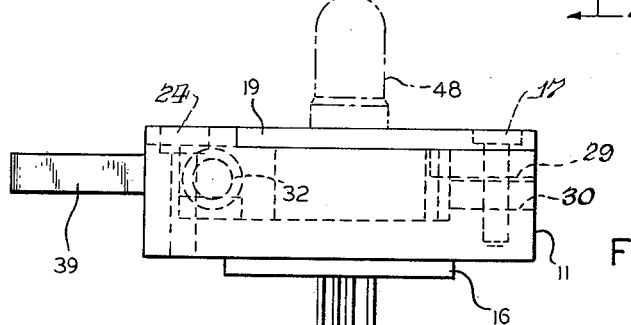
Figure 3:
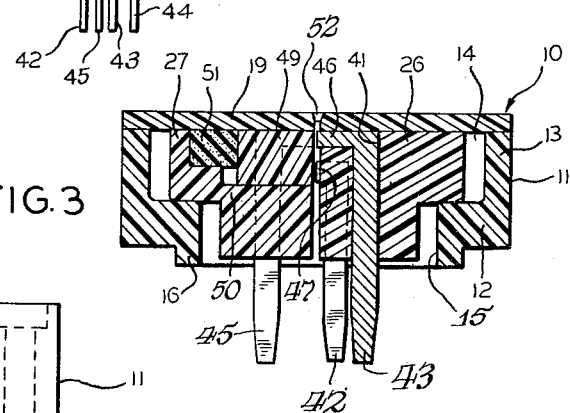
Figure 4:
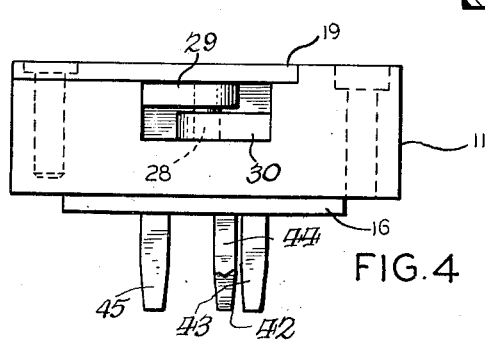

FIGURE 1 is a top plan view of a test socket embodying the invention, and in which portions of the cover plate are broken away to disclose certain structural details; FIGURE 2 is a side view in elevation taken generally along the plane 2—2 of FIGURE 1; FIGURE 3 is a transverse sectional view taken along the line 3—3 of FIGURE 1; FIGURE 4 is an end view in elevation taken generally along the plane 4—4 of FIGURE 1; FIGURE 5 is a top plan view of the jaw or carrier assembly with the cam lever and biasing springs illustrated by broken lines; FIGURE 6 is an end view in elevation of the structure shown in FIGURE 5, and is taken generally along the line 6—6 of FIGURE 5; FIGURE 7 is a longitudinal sectional view taken along the line 7—7 of FIGURE 5; FIGURE 8 is a vertical sectional view taken along the line 8—8 of FIGURE 7; FIGURE 9 is a vertical sectional view taken along the line 9—9 of FIGURE 7; and FIGURE 10 is a vertical sectional view taken along the line 10—10 of FIGURE 7.

The electrical socket in its entirety is designated with the numeral 10, and includes a base or frame 11 comprising a bottom wall 12 and an upwardly extending, generally perimetric wall 13 integral therewith and defining a compartment 14. The bottom wall 12 is provided with an enlarged central opening 15 therein communicating with the compartment 14, and has a depending lip 16 surrounding the opening 15 at the lower end thereof. Removably secured to the base 11 by cap screws 17 and 18 is a cover plate 19. The plate 19 at diagonally opposite corners thereof has irregularly-shaped cut-out portions 20 and 21 which serve as polarizing means to assure a uni-lateral orientation of the cover relative to the base. Such cut-out portions respectively correspond to lands or bosses 22 and 23 provided by the base along the vertically extending wall 13 thereof, and such bosses are respectively provided with countersunk passages 24 and 25 therethrough adapted to receive bolts or screws for rigidly anchoring the test socket to a bench or other support (not shown).

Mounted within the compartment 14 below the cover 19 is a carrier comprising a pair of carrier segments 26 and 27 in the form of a pair of jaws that are pivotally secured to each other at one end thereof by a pin 28. The pin 28 rotatably extends through vertically spaced end portions 29 and 30 respectively provided by the carrier or jaw segments 26 and 27; and if desired, may be elongated slightly for receipt in an aperture provided therefor in the bottom wall 12 of the base 11. Thus, the jaw segments are pivotal with respect to each other about the axis of the pin 28 between open and closed positions, and are biased toward the closed position thereof (as shown in FIGURE 1) by helical springs 31 and 32—the first of which seats at one end against the wall 13 of the base and at its other end against an extension or leg 33 provided by the jaw segment 26, and the other of which seats at one end thereof against the wall 13 of the base and at its other end against an extension or leg 34 provided by the jaw segment 27.

The legs 33 and 34 are spaced from each other and define facing cam surfaces 35 and 36 adapted to be respectively engaged by cam followers 37 and 38 provided by a cam or lever element 39 pivotally carried by the bottom wall 12 of the base on a pin 40, which at its lower end may be threadedly secured thereto. The lever 39 extends through a slot or recess provided therefor in the vertical wall 13 of the base; and when the lever is rotated in a counter-clockwise direction, as viewed in FIGURE 1, the follower portions 37 and 38 thereof are brought into engagement with the cam surfaces 35 and 36 of the jaw segments, and urge the legs 33 and 34 outwardly against the biasing force provided by the springs 31 and 32 so as to open the jaw segments 26 and 27. Reverse rotation of the lever 39 into the position shown in FIGURE 1 releases the legs 33 and 34 to permit the springs 31 and 32 to bias the same toward the closed position thereof. It will be noted that the jaws 26 and 27 are equipped along the lower surface thereof with a boss freely received within the large central opening 15 in the base, and sufficient clearance is provided to permit opening of the jaws. Actually, the jaws are floatingly supported within the compartment 14 by the springs 31 and 32 which automatically center the jaws yet accommodate any lateral shift or offset enforced thereon during testing of an electrical component in a manner that will be described subsequently. Quite conceivably, only one jaw segment could be movably supported for opening and closing movements, the other being stationary.

The jaw segment 26 is equipped with a plurality of inverted, generally L-shaped openings 41 threthrough, and mounted in the openings are contacts of inverted, generally L-shaped configuration. In the specific structure shown, there are three such contacts (the precise number may vary from socket to socket,) and for identification they are denoted with the numerals 42, 43 and 44, and the respective openings with the numerals 41a, 41b and 41c. The tail of each of the contacts extends downwardly through the boss portion of the jaw which is disposed within the central opening 15 in the bottom wall of the base, and each tail is adapted to be connected with a suitable circuit conductor. The upper end of each of the contacts extends laterally from the tail and terminates (as shown at 46 in FIGURE 3) adjacent the jaw segment 27. Replacement of a contact is readily accomplished with the cover 19 removed by simply sliding the contact upwardly through the jaw 26 since each of the contacts rests freely in the opening 41 provided therefor. It will be noted that the laterally turned upper end of each contact extends slightly beyond the inner face 47 of the jaw segment 26 so as to assure a good engagement with the respective leads or prongs of an electric device 48 arranged in test relation with the socket.

The contacts 42 through 44 respectively cooperate with bearing or presser pad structure 49 supported by the bottom wall 50 of the jaw segment 27 in alignment with the contacts 42 through 44. The pad structure is freely movable toward and away from the contacts 42–44, or from left to right as viewed in FIGURE 3, and is biased toward these contacts by a resilient component 51 in the form of a generally rectangular block supported by the jaw segment 27. It will be apparent that various resilient arrangements may be employed for urging the pressure pad structure 49 toward the contacts, and the purpose thereof is to assure a good engagement of the leads or prongs of the electric device 48 with the contacts and to accommodate any variation in the placement of such leads without damage thereto or to the contacts. Consequently, a plurality of individual presser pads respectively aligned with the contacts 42 through 44 and separately biased theretoward could be provided; and as another example, the contacts 42–44 could be floatingly supported in the jaw 26 and resiliently biased toward the jaw 27.

The pad structure 49 is provided with one or more openings therein depending upon the particular test socket; and in the specific illustration, one such opening is present and is denoted with the numeral 41d. Positioned within this opening is a contact 45, the tail of which extends downwardly through the boss segment of the jaw 27 which is disposed within the central opening 15 in the bottom wall of the base; and this tail is adapted to be connected to a suitable circuit conductor. It will be apparent that the bottom wall 50 of the jaw segment 27 must have an opening therein to pass the tail of the contact 45 therethrough; and since the pad structure 49 is supported for transverse movement, such opening in the wall 50 is elongated from left to right as seen in FIGURE 3, and may comprise a slot extending completely to the face or inner edge of the jaw segment. The upper end of the contact 45 extends laterally from the tail thereof and terminates, as shown most clearly in FIGURE 3, adjacent the face of the jaw segment 26. Preferably, the end of the contact extends outwardly slightly beyond the inner edge of the pad structure 49; and since the contact rests freely within the pad structure, mounting and replacement of the contact is readily accomplished.

It will be noted that the contacts define a staggered or offset relationship one with respect to another, and this is done for the purpose of minimizing inductance and capacitance among the contacts. More specifically, and considering in particular FIGURES 3, 5 and 8 through 10, it is seen that the contacts or the openings therefor are offset or spaced from each other along the longitudinal axis of the socket (that is, along the parting line of the jaw segments 26 and 27); and with respect to the contacts 42, 43 and 44, all of which are carried by the jaw segment 26, each is offset from the one adjacent thereto along the transverse axis of the socket (that is, along a line generally normal to the parting line of the jaw segments). Additionally, the contacts are offset or arranged in a staggered vertical relationship. More particularly, the contacts 42 and 44 and their respective openings and especially the laterally turned upper ends of these contacts are located centrally in a vertical sense within the jaw segment 26, while the contact 43 and its laterally turned upper end is adjacent the top surface of the jaw segment 26. Similarly, the contact 45 and its laterally turned end is disposed adjacent the upper surface of the pad structure 49. The precise orientation will depend upon the number of contacts in the socket, and may be varied from socket to socket.

Preferably, the pad 49 and biasing element 51 are freely supported by the jaw segment 27 so that they can be readily removed and replaced if necessary. In the specific form shown, the resilient biasing member 51 is a body of rubber or rubber-like material such as neoprene, and the pad 49 is formed of an insulating material that is preferably firm and durable, such as Teflon. The contacts 42 through 44 are conductors and therefore are formed of metal, such as a phosphor bronze composition. The base 11, cover 19 and jaw segments 26 and 27 are all formed of insulating material as, for example, glass-filled diallyl phthalate.

The cover 19 has a plurality of apertures 52 therein respectively oriented adjacent the contacts 42 through 45 and in general alignment with the face 47 of the jaw segment 26 when the jaws are in the closed position, as shown in FIGURES 1 and 3. The apertures 52 are adapted to pass the leads or prongs of the device 48 therethrough; and in the particular test socket disclosed, the apertures 52 all lie along the longitudinal center line of the cover 19 because the socket is intended for use in the testing of transistors (or similar electrical components) having the leads oriented along a straight line. It will be evident that any number of contacts may be provided along with the associated pad structure and apertures 52, and then the test socket is adaptable for use in testing various electric devices irrespective of the number of leads or prongs provided thereby.

In use of the test socket, the various contacts 42 through 45 are connected with circuit conductors so as to include the same in a circuit suitable for testing the device 48. Preferably, the base 11 of the socket is anchored to a bench so as to rigidify the socket and thereby facilitate test operations. When it is desired to test a device 48, the lever 39 is rotated in a counter-clockwise direction (as viewed in FIGURE 1) to open the jaw segments 26 and 27 and thereby move the contacts from adjacency with the apertures 52. The prongs or leads of the device 48 are then inserted through the apertures 52, and it will be noted that the spacing between the apertures (and consequently between the contacts) varies slightly, and such spacing will be in correspondence with that defined between the prongs of the device 48 whereby the device can only be mounted in one way in the test socket. Thereafter, the lever 39 is swung to the position shown in FIGURE 1, and the springs 31 and 32 force the jaw segments 26 and 27 into the closed position thereof.

Since the jaw segments float between the springs 31 and 32, the jaws are automatically brought into a centered relation with respect to the prongs of the device 48 and accommodate any distortion of such prongs without damage thereto. The presser pad structure 49 is urged toward the respective contacts not only because of the biasing force of the springs 31 and 32, but because of the resilient force applied to the pad by the resilient block 51. The pad 49 (or respective pads, as the case may be) engage the prongs of the device 48 and urge the same into tight engagement with the upper end portions of the contacts 42 through 45, thereby effecting a good electrical connection therebetween. Because the pad structure 49 effectively relates and establishes an independence of one contact with respect to another, only that degree of force is applied to the prongs of the device 48 which is necessary to assure a firm engagement thereof with the contacts, thus accommodating any variance from normal in the location of the prongs of the device.

After the test has been completed, the lever 39 is rotated so as to cam or urge the jaw segments 26 and 27 into the open position thereof, whereupon the device 48 may be removed from the test socket. Consequently, both when the prongs of the device 48 are inserted into the socket and are subsequently removed therefrom, the contacts 42 through 45 are remote from the prongs, with the result that neither the contacts nor prongs of the device are worn by such insertion and removal. Therefore, the lift of the test socket is wholly independent of frictional wear developed between the prongs of the test device and engaging surfaces of the socket. Should it be desirable or necessary to replace any of the components of the test socket, this is readily accomplished by releasing the screws 17 and 18 and removing the cover plate 19 to provide access to the various elements, since all of the contacts as well as the pads 49 and biasing element 51 are freely supported by the jaw segments 26 and 27. Additionally, the force developed between the prongs of the device 48 and contacts of the test socket is readily altered by changing the springs 31 and 32 and/or the biasing element 51. It may be noted that the test socket may be equipped with a larger number of contacts—seven or nine, for example, and can then be made to accommodate devices 48 having different numbers of prongs simply by changing the cover plate 19 to one having the necessary number of apertures 52 therein aligned with the appropriate contacts.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

I claim:

1. In a socket for use with electric components having leads defining conductors therfore, a base provided with a compartment therein, a pair of carriers constrained within said compartment for selective movement between open and closed positions, resilient means operative between said base and said carriers for floatingly supporting the same within said compartment and for biasing the carriers into their closed position, lever structure pivotally supported by said base and being selectively engageable with said carriers to urge the same into the open position thereof against the biasing force of said resilient means, a plurality of contacts supported by at least one of said carriers for engagement with such leads when said carriers are in the closed position thereof, at least one presser pad structure associated with said contacts and being supported by one of said carriers for urging such leads and said contacts into engagement with each other when said carriers are in their closed position, and a cover mounted upon said base and extending over said compartment and being provided with a plurality of apertures adapted to pass such leads therethrough to orient the same for engagement with said contacts.

2. The socket of claim 1, and further comprising resilient means supported by the presser pad-equipped carrier in engagement with said presser pad to resiliently urge the same toward such leads when said carriers are in their closed position.

3. The socket of claim 1 in which said lever structure is equipped with cam followers, and in which said carriers provide cam surfaces engageable with said cam followers to effect the aforesaid movement of the carriers into their open position.

References Cited in the file of this patent

UNITED STATES PATENTS

| | | |
|---|---|---|
| 468,654 | Gibbs | Feb. 9, 1892 |
| 2,735,945 | Colton et al. | Feb. 21, 1956 |

FOREIGN PATENTS

| | | |
|---|---|---|
| 573,859 | France | Mar. 19, 1924 |
| 216,045 | Switzerland | Nov. 17, 1941 |
| 1,170,880 | France | Sept. 29, 1958 |